3,636,002
1-(2-HALOBENZYLOXY-1-INDANYL)-IMIDAZOLES
Erik Fred Godefroi, Turnhout, Belgium, assignor to
Janssen Pharmaceutica, N.V.
No Drawing. Filed Dec. 15, 1969, Ser. No. 885,365
Int. Cl. C07d 49/36
U.S. Cl. 260—309    7 Claims

ABSTRACT OF THE DISCLOSURE

The compounds are of the class of 1-(2-halobenzyloxy-1-indanyl)-imidazoles useful for their anti-fungal activity. A novel intermediate, 1-(1-imidazolyl)-2-indanol is also presented.

---

This invention relates to novel imidazole derivatives and, more particularly, to 1-(2-halobenzyloxy-1-indanyl)-imidazoles having the following formula:

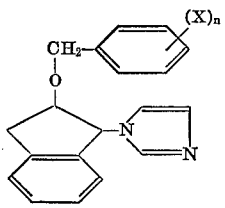

and the therapeutically active acid addition salts thereof, wherein X is halo, i.e., chloro, bromo, fluoro and iodo, and $n$ is an integer from 1 to 3. When $n$ is more than one, X may be the same or different halo function.

The imidazoles of Formula I are readily obtained by the O-alkylation of 1-(1-imidazolyl)-2-indanol (II) with an appropriate halobenzyl halide (III) of the formula:

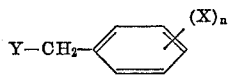

in which X and $n$ are as previously described and Y is halo, preferably chloro or bromo. Accordingly, the hydroxyl of said 1-(1-imidazolyl)-2-indanol is first converted to its alkali metal salt form by treatment with an appropriate strong base such as an alkali metal amide or hydride and the thus-obtained alkali metal salt is then reacted with (III). Suitable solvents for the O-alkylation procedure include the aromatic hydrocarbons, e.g., benzene, toluene, xylene and the like; the dialkylformamides, e.g., dimethylformamide and diethylformamide; and ethers such as tetrahydrofuran, 1,2-dimethoxyethane and the like. Elevated temperatures may be advantageously employed to accelerate the rate of reaction. The resulting imidazole product may be recovered from the reaction mixture according to conventional isolation procedures either as the free base, or, if so desired, in the form of an acid addition salt by treatment of the product mixture with a suitable acid. The foregoing O-alkylation procedure may be further illustrated by the following schematic diagram:

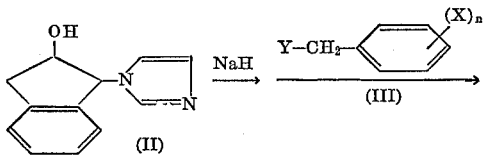

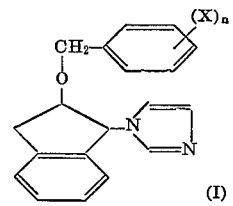

The starting compound, 1-(1-imidazolyl)-2-indanol (II), is believed to be novel, and, in view of its utility in the foregoing O-alkylation procedure, said compound constitutes an additional feature of this invention.

As noted previously, depending upon the conditions employed, the novel compounds (I) are obtained either in the form of the free base or salt thereof. The salt form is converted to the free base form in the standard manner, i.e., by reaction with alkali such as sodium or potassium hydroxide. The compounds in base form may be converted to their therapeutically useful acid addition salt form by reaction with an appropriate acid, such as, for example, an inorganic acid such as hydrohalic acid, e.g., hydrobromic, hydrochloric or hydroiodic acid; sulfuric, nitric, thiocyanic phosphoric acid and the like; or an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxybenzoic, 2-acetoxybenzoic and the like acids.

The subject compounds of Formula I and the acid addition salts thereof are useful agents in combatting fungi as demonstrated by their broad spectrum of antifungal action. The data given in the following table illustrate such activity. The method employed in obtaining the tabulated data is that reported by Vanbreuseghem et al., Chemotherapia, 12, 107 (1967).

The tests on fungi were performed using Sabouraud's liquid medium (1 g. of neopeptone Difco and 2 g. of glucose Difco per 100 ml. distilled water) in 16 x 160 mm. test tubes, each containing 4.5 ml. of liquid medium, autoclaved at 120° C. for 15 minutes. The drug to be tested is primarily dissolved in ethanol 50% at a concentration of 20 mg./ml. and afterwards diluted with sterile distilled water in order to obtain a concentration of 10 mg./ml. Successive decimal dilutions were made in distilled water. To each tube, containing 4.5 ml. of Sabouraud's liquid medium, 0.5 ml. of a dilution of the drug was added in order to obtain 1000γ, 500γ, 100γ, 10γ and 1γ per ml. medium (the symbol "γ" equals "microgram"). A control tube was prepared by adding 0.5 ml. distilled water to 4.5 ml. medium. The concentration of ethanol in the control tubes was the same as in those containing 1000γ and 500γ/ml. of the drug. The filamentous fungi were incubated at 25° C. for two to three weeks. A square block of 2 mm. side was cut and inoculated in the liquid medium. A three-day-old culture on Sabouraud's liquid medium was used for yeasts. The inoculum was 0.05 ml. per tube. All the cultures were made in duplicate and incubated at 25° C. for 14 days. The first readings were made after 7 days and the final ones after 14 days (the data given in Table I are the final scores observed after 14 days for each compound at the concentration of 100 micrograms per milliliter culture). The score was established assuming a maximum growth for the control tube which was given score 4. The complete absence of growth after 14 days was scored 0, while growths equal to ¼, ½ and ¾ of the controls were rated respectively 1, 2 and 3.

It is understood that the compounds in the following table are not listed for purposes of limiting the invention thereto, but only to exemplify the useful properties of all the compounds within the scope of Formula I, including the pharmaceutically acceptable acid addtiion salts thereof.

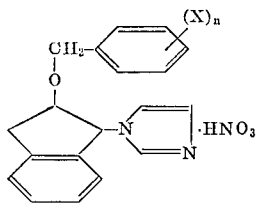

TABLE I.—FUNGISTATIC ACTIVITY

| (X)ₙ | Final score at 100 μg./ml.¹ | | | | | | | | | | |
|---|---|---|---|---|---|---|---|---|---|---|---|
| | 1 | 2 | 3 | 4 | 5 | 6 | 7 | 8 | 9 | 10 | 11 |
| 4-Cl | 0 | 0 | 0 | 0 | 1 | 4 | 1 | 1 | 0 | 0 | 0 |
| 2,4-di-Cl | 0 | 0 | 0 | 1 | 1 | 3 | 1 | 2 | 0 | 0 | 0 |
| 4-F | 0 | 0 | 0 | 1 | 2 | 4 | 2 | 0 | 0 | 0 | 0 |
| 2,6-di-Cl | 0 | 0 | 0 | 0 | 1 | 3 | 2 | 4 | 0 | 0 | 0 |
| 2-Cl | 0 | 0 | 0 | 0 | 1 | 3 | 1 | 0 | 0 | 0 | 0 |

¹ NOTE:
1=*Microsporum canis*.
2=*Trichophyton mentagrophytes*.
3=*Trichophyton rubrum*.
4=*Phialophora verrucosa*.
5=*Cryptococcus neoformans*.
6=*Candida tropicalis*.
7=*Candida albicans*.
8=Mucor.
9=*Aspergillus fumigatus*.
10=*Sporotrichum schenckii*.
11=Saprolegnia.

The following examples are intended to illustrate, but not to limit, the scope of the present invention. Unless otherwise stated, all parts are by weight.

EXAMPLE I

A mixture of 54 parts of imidazole, 120 parts of sodium methoxide solution 30% in methanol and 400 parts of dimethylformamide is heated to 125° C. to remove the methanol. Then there are added 107 parts of 2-bromo-1-indanol in 80 parts of benzene and 150 parts of fresh dimethylformamide, at 115–130° C. with solvent removal. After cooling to 80° C., there are added 1500 parts of water and after further cooling on ice, the precipitated product is filtered. It is dissolved in a mixture of 1000 parts of water and 80 parts of hydrochloric acid. The solution is filtered and the filtrate is basified, yielding about 75 parts of crude 1-(1-imidazolyl)-2-indanol. Recrystallization from 2-propanol yields pure 1-(1-imidazolyl)-2-indanol; M.P. 174° C.

EXAMPLE II 8 parts of 1-(1-imidazolyl)-2-indanol are added portionwise to 2 parts of sodium hydride 50% in 36 parts of tetrahydrofuran at 50° C. Upon completion, stirring at reflux temperature is continued for 30 minutes. The reaction mixture is cooled and there are added 8 parts of p-chlorobenzyl chloride. The whole is stirred and refluxed for 18 hours. The reaction mixture is diluted with 240 parts of ether. The organic phase is washed with water (four times), dried, and upon the addition of an excess of concentrated nitric acid solution, the nitrate salt is precipitated. It is filtered off and recrystallized from a mixture of ethanol and diisopropylether, yielding about 4.5 parts of 1-[2-(p-chlorobenzyloxy) - 1 - indanyl]imidazole nitrate; M.P. 108.5° C.

EXAMPLE III 10 parts of 1-(1-imidazolyl)-2-indanol are added portionwise to 2.5 parts of sodium hydride 50% in 45 parts of tetrahydrofuran at 50° C. Upon completion, stirring at reflux temperature is continued for 30 minutes. The reaction mixture is cooled and 12 parts of 2,4-dichlorobenzyl chloride are added. The whole is stirred and refluxed for 3 hours. Then there are added 240 parts of ether. The organic phase is washed with water, dried, and an excess of nitric acid (concentrated) is added. The precipitated solid nitrate salt is filtered off and recrystallized from a mixture of 32 parts of ethanol and 320 parts of diisopropylether, yielding about 11 parts of 1-[2-(2,4 - dichlorobenzyloxy) - 1 - indanyl]imidazole nitrate; M.P. 122° C.

EXAMPLE IV

To 2.5 parts of sodium hydride in 45 parts of tetrahydrofuran are added portionwise 10 parts of 1-(1-imidazolyl)-2-indanol at 60° C. in the course of 15 minutes. Upon completion, stirring is continued at reflux for 30 minutes. Then there are added 9 parts of p-fluorobenzyl chloride and stirring at reflux is continued for another 4 hours. The product is extracted with 240 parts of ether. The organic phase is washed five times with water, dried, and then there is added an excess of concentrated nitric acid solution. The precipitated nitrate salt is filtered off and recrystallized from a mixture of 60 parts of ethanol and 240 parts of diisopropylether, yielding about 10.2 parts of 1-[2-(p-fluorobenzyloxy) - 1 - indanyl]imidazole nitrate; M.P. 119° C.

EXAMPLE V 10 parts of 1-(1-imidazolyl)-2-indanol are added to 2.5 parts of sodium hydride 50% in 45 parts of tetrahydrofuran at 50° C. Upon completion, stirring is continued at reflux temperature for 30 minutes. Then there are added 12 parts of 2,6-dichlorobenzyl chloride and the whole is further stirred at reflux for 3 hours. The product is extracted with ether (240 parts). The organic phase is washed four times with water, dried, and then there is added an excess of concentrated nitric acid solution. The precipitated nitrate salt is filtered off and recrystallized from a mixture of 32 parts of ethanol and 320 parts of diisopropylether, yielding about 12.3 parts of 1-[2-(2,6-dichlorobenzyloxy) - 1 - indanyl]imidazole nitrate; M.P. 129.5° C.

EXAMPLE VI

To 2.5 parts of sodium hydride 50% in 45 parts of tetrahydrofuran are added portionwise 10 parts of 1-(1-imidazolyl)-2-indanol and upon completion, the whole is stirred at reflux temperature for 30 minutes. Then there are added 10 parts of o-chlorobenzyl chloride and stirring at reflux is continued for another 4 hours. The product is extracted with ether. The organic phase is washed five times with water, dried, and there is added an excess of concentrated nitric acid solution. The precipitated nitrate salt is filtered off and recrystallized from a mixture of 32 parts of acetone and 80 parts of diisopropylether, yielding about 4.4 parts of 1-[2-(o-chlorobenzyloxy)-1-indanyl] imidazole nitrate; M.P. 87° C.

EXAMPLE VII

The O-alkylation procedure of the foregoing examples may be used to prepare the compounds of Formula I other than those specifically exemplified by using an equivalent amount of an appropriate halobenzyl halide of Formula III. Thus, by repeating the procedure of Example VI, except that an equivalent quantity of 2,4,6-trichlorobenzyl chloride is substituted for the o-chlorobenzyl chloride used therein, 1-[2,(2,4,6-trichlorobenzyloxy)-1-indanyl] imidazole nitrate is obtained as the respective product.

EXAMPLE VIII

Neutralization of the nitrate salts obtained in Examples II through VII by treatment with an equivalent amount of sodium hydroxide yields the corresponding bases of Formula I as respective products.

In addition to their anti-fungal activity, the subject compounds (I) and acid addition salts thereof are useful anti-bacterial agents, being particularly effective against gram positive bacteria, such as, for example, *Erysipelothrix insidiosa, Staphylococcus hemolyticus, Streptococcus pyogenes,* and the like. This anti-bacterial property is manifested at very low inhibitory concentrations of active ingredient, e.g., in excess of 1 mcg./ml.

I claim:

1. A chemical compound selected from the group consisting of a 1-(2-halobenzyloxy-1-indanyl)-imidazole having the formula:

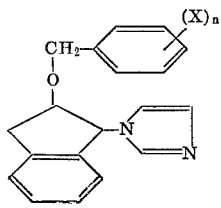

wherein X is halo and $n$ is an integer from 1 to 3.

2. 1-[2-(p-chlorobenzyloxy)-1-indanyl]imidazole and the therapeutically active acid addition salts thereof.

3. 1 - [2-(2,4-dichlorobenzyloxy)-1-indanyl]imidazole and the therapeutically active acid addition salts thereof.

4. 1-[2-(p-fluorobenzyloxy)-1-indanyl]imidazole and the therapeutically active acid addition salts thereof.

5. 1 - [2-(2,6-dichlorobenzyloxy)-1-indanyl]imidazole and the therapeutically active acid addition salts thereof.

6. 1-[2-(o-chlorobenzyloxy)-1-indanyl]imidazole and the therapeutically active acid addition salts thereof.

7. 1-(1-imidazolyl)-2-indanol.

References Cited

UNITED STATES PATENTS 3,547,942   12/1970   Godefroi et al. _____ 260—309

HENRY R. JILES, Primary Examiner

G. T. TODD, Assistant Examiner

U.S. Cl. X.R.

424—273